United States Patent
Harada

(10) Patent No.: US 11,465,582 B2
(45) Date of Patent: Oct. 11, 2022

(54) BASE FABRIC FOR COATED AIRBAG, MANUFACTURING METHOD THEREFOR, AND COATING COMPOSITION USED FOR SAID MANUFACTURING METHOD

(71) Applicant: TOYOBO CO., LTD., Osaka (JP)

(72) Inventor: Hirotaka Harada, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 16/979,669

(22) PCT Filed: Mar. 13, 2019

(86) PCT No.: PCT/JP2019/010299
§ 371 (c)(1),
(2) Date: Sep. 10, 2020

(87) PCT Pub. No.: WO2019/177033
PCT Pub. Date: Sep. 19, 2019

(65) Prior Publication Data
US 2021/0024029 A1 Jan. 28, 2021

(30) Foreign Application Priority Data
Mar. 13, 2018 (JP) .............................. JP2018-045817

(51) Int. Cl.
*B60R 21/235* (2006.01)
*D06M 15/643* (2006.01)
*D06M 23/12* (2006.01)

(52) U.S. Cl.
CPC ......... *B60R 21/235* (2013.01); *D06M 15/643* (2013.01); *D06M 23/12* (2013.01); *B60R 2021/23514* (2013.01); *B60R 2021/23519* (2013.01)

(58) Field of Classification Search
CPC ........... B60R 2021/23514; B60R 2021/23519; B60R 21/235; D06M 15/643; D06M 23/04; D06M 23/12; D06N 2205/04; D06N 2211/268; D06N 3/0006; D06N 3/128
See application file for complete search history.

(56) References Cited

U.S. PATENT DOCUMENTS

| | | | | |
|---|---|---|---|---|
| 5,240,765 A | * | 8/1993 | Takahashi | C08J 3/24 428/220 |
| 2001/0019740 A1 | | 9/2001 | Child et al. | |
| 2001/0021417 A1 | | 9/2001 | Child et al. | |
| 2002/0055311 A1 | | 5/2002 | Child et al. | |
| 2002/0061691 A1 | | 5/2002 | Child et al. | |
| 2002/0120065 A1 | * | 8/2002 | Johoji | C08L 23/14 525/240 |
| 2012/0295086 A1 | * | 11/2012 | Baldwin | B32B 27/32 428/215 |

FOREIGN PATENT DOCUMENTS

| CN | 1387484 | 12/2002 |
|---|---|---|
| CN | 1390169 | 1/2003 |
| CN | 102781734 | 11/2012 |
| EP | 2540580 | 1/2013 |
| JP | 2006/027373 | 2/2006 |
| JP | 2008-002003 | 1/2008 |
| JP | 2013-119688 | 6/2013 |
| WO | 2011/105142 | 9/2011 |
| WO | WO 2014/008322 | 1/2014 |

OTHER PUBLICATIONS https://patents.google.com/patent/EP2540580A1/en?oq=+EP2540580+A1 (Year: 2010).*
Japan Patent Office, International Search Report for PCT/JP2019/010299 dated Jun. 11, 2019 with English translation.
EPO Extended Search Report in European Appln. No. 19768337.8, dated Jul. 26, 2021, 7 pages.
Mei, "Dictionary of Textiles," China Textile Press, 1st edition, Jan. 31, 2007, p. 159, 4 pages, with English Translation.
Song et. al., "Design and manufacture of packaging container structure," Printing Industry Press, 1st edition, Aug. 31, 1996, pp. 174-176, 10 pages, with English Translation.
Chinese Patent Office, Office Action in Chinese Appln. No. 201980018453.8, dated Feb. 7, 2022, 19 pages, with English Translation.
Indian Patent Office, Office Action in Indian Appln. No. 202017043792, dated Aug. 22, 2022, 6 pages.

* cited by examiner

Primary Examiner — Arti Singh-Pandey
(74) Attorney, Agent, or Firm — Fish & Richardson P.C.

(57) ABSTRACT

Provided is a coated fabric for airbags, comprising a coating layer disposed on at least one surface of a woven fabric directly or with one or more other layers interposed therebetween, the coating layer containing a thermally responsive foaming agent.

12 Claims, No Drawings

BASE FABRIC FOR COATED AIRBAG, MANUFACTURING METHOD THEREFOR, AND COATING COMPOSITION USED FOR SAID MANUFACTURING METHOD

TECHNICAL FIELD

The present invention relates to a coated fabric for airbags, a method for producing the fabric, and a coating composition for used in the production method.

BACKGROUND ART

Airbags are used for the purpose of protecting the human body, such as an occupant's face and front of head, in the event of a collision due to a car accident. Specifically, in airbag systems, a sensor operates in response to a collision impact to generate a high-temperature and high-pressure gas, with which the airbag is instantaneously inflated to achieve the above purpose. In recent years, airbags have become widespread as a type of safety equipment, and the practical applications thereof, such as not only airbags installed for driver and passenger seats, but also other airbags, including knee airbags, side airbags, and curtain airbags, have increased. Furthermore, an increasing number of automobiles are equipped with multiple airbags as standard equipment.

Along with an increase in the number of airbags to be installed and the installation sites thereof, there is a growing demand for further reduction in the weight and size of airbag systems, and each part of the systems has been designed to be smaller and lighter. Under such circumstances, reduction in weight of the bag body of airbags by reducing the bag volume or using a non-coated fabric has also been studied.

Several types of inflators for inflating airbags are now available. From the viewpoint of reduction in weight and size, the use of pyro-type inflators has recently increased rapidly. However, pyro-type inflators tend to have a large thermal impact on airbags because large amounts of partially combusted components from a gas-generating agent and suspended particles of gunpowder combustion residues are generated. It is thus desired that not only a fabric used for the airbag main body, but also a heat-resistant reinforcing fabric used for an inflator attachment port, on which a heat load is especially applied, have high heat resistance.

Waste pieces obtained after cutting a fabric for the airbag main body have been used as a reinforcing fabric. As the weight of a fabric for the main body becomes lighter, the heat resistance of the fabric for the main body becomes lower; to compensate for this, it is necessary to increase the number of pieces of the reinforcing fabric used. Increasing the number of pieces of the reinforcing fabric makes the sewing operation complicated, and results in an increase in the mass of the entire airbag. There is thus a demand for a fabric that can resist thermal damage, even if the number of pieces of the fabric used is reduced.

To withstand high-temperature gas instantaneously released from an inflator, coated fabrics have been used in which a heat-resistant elastomer, such as chloroprene rubber or silicone rubber, is adhered to a woven fabric in an amount of 60 to 120 g/m². Further, a fabric for airbags has been studied in which multiple layers are formed by applying a coating liquid of an elastomer resin multiple times, and in which the total coating amount is 100 to 400 g/m² in terms of the elastomer resin (e.g., see Patent Literature 1).

CITATION LIST

Patent Literature

PTL 1: JP2008-002003A

SUMMARY OF INVENTION

Technical Problem

Through their own investigation, the present inventors found that although conventional coated fabrics for airbags have excellent heat resistance because of a large coating amount of a resin, they are large in mass as a whole, which is not favorable in terms of weight reduction. The inventors also found another problem such that conventional fabrics are not favorable in terms of packageability because their coating layer is hard. Moreover, the inventors found a further problem such that when the coating amount of a resin is large, the adhesiveness due to contact between the coated surfaces is increased.

Thus, an object of the present invention is to provide a coated fabric for airbags that achieves sufficient heat resistance, without relying on the amount or type of resin in a coating layer.

Solution to Problem

After repeated trial and error to achieve the above object, the present inventors first established a unique heat resistance evaluation method suitable for coated fabrics for airbags. This evaluation method enables evaluation of heat resistance of fabrics, taking into consideration the influences of heat capacity and heat transfer. The present inventors conducted extensive research using the evaluation method, and found that a coated fabric for airbags that comprises a coating layer containing a thermally responsive foaming agent has excellent heat resistance due to the action of the distinctive coating layer; and thus achieves sufficient heat resistance without relying on the amount or type of resin in the coating layer.

The present inventors conducted further extensive research based on this finding, and accomplished the present invention. The present invention includes the following embodiments.

Item 1.

A coated fabric for airbags, comprising a coating layer disposed on at least one surface of a woven fabric directly or with one or more other layers interposed therebetween, the coating layer comprising a thermally responsive foaming agent.

Item 2.

The coated fabric for airbags according to Item 1, wherein the thermally responsive foaming agent is a thermally decomposable chemical foaming agent.

Item 3.

The coated fabric for airbags according to Item 1 or 2, wherein the coating layer is a porous body having closed cells.

Item 4.

The coated fabric for airbags according to Item 3, wherein the coating layer is a layer foamed using at least one member selected from the group consisting of chemical foaming agents, inflatable microcapsules, and hollow microcapsules.

Item 5.

The coated fabric for airbags according to any one of Items 1 to 4, wherein the coating layer comprises a resin.

Item 6.

The coated fabric for airbags according to any one of Items 1 to 4, wherein the coating layer comprises a resin in an amount of 10 to 200 g/m² per area of the surface of the woven fabric.

Item 7.

The coated fabric for airbags according to Item 5 or 6, wherein the resin is a silicone-based resin.

Item 8.

A composition for use in coating of a coated fabric for airbags, the composition comprising a thermally responsive foaming agent.

Item 9.

The composition according to Item 8, for use in a method for producing a coated fabric for airbags at a temperature lower than a foaming start temperature of the thermally responsive foaming agent.

Item 10.

A method for producing a coated fabric for airbags, the method comprising:

(1) disposing a coating layer material comprising a thermally responsive foaming agent on at least one surface of a woven fabric directly or with one or more other layers interposed therebetween.

Advantageous Effects of Invention

The coated fabric for airbags of the present invention achieves sufficient heat resistance without relying on the amount or type of resin in a coating layer.

DESCRIPTION OF EMBODIMENTS

The coated fabric for airbags of the present invention comprises a coating layer disposed on at least one surface of a woven fabric directly or with one or more other layers interposed therebetween, the coating layer comprising a thermally responsive foaming agent.

Woven Fabric

The woven fabric is excellent as a fabric for airbags since it is excellent in mechanical strength and reducible thickness. The structure of the woven fabric may be, but is not limited to, a plain weave, a twill weave, a sateen weave, a variation of these weaving patterns, a multiaxial woven pattern, or the like; of these, a plain-weave fabric, which is excellent in mechanical strength, is particularly preferable.

The woven fabric is preferably a fabric woven from a synthetic fiber yarn.

As synthetic fibers, a plurality of types of synthetic fibers may be used, if necessary. The synthetic fibers are not particularly limited, and can be selected from a wide range. Examples of synthetic fibers include aliphatic polyamide fibers, such as nylon 66, nylon 6, nylon 46, and nylon 12; aromatic polyamide fibers, such as aramid fibers; polyester fibers, such as polyethylene terephthalate, polytrimethylene terephthalate, and polybutylene terephthalate; wholly aromatic polyester fibers; poly(p-phenylene benzobisoxazole) fibers (PBO fibers); ultrahigh-molecular-weight polyethylene fibers; polyphenylene sulfide fibers; polyether ketone fibers; and the like. From an economical viewpoint, polyester fibers and polyamide fibers are preferable, and polyamide 6,6 is particularly preferable, as synthetic fibers. These synthetic fibers may be obtained from a starting material, part or all of which is a recycled material.

The synthetic fibers may contain various additives in order to make it easier to perform the yarn production and subsequent weaving process. Examples of additives include antioxidants, heat stabilizers, smoothing agents, antistatic agents, thickening agents, flame retardants, and the like.

The synthetic fibers may be solution-dyed yarn, or a yarn dyed after spinning. The cross-sectional surface of a single yarn is not particularly limited; and may be, for example, a usual round cross-section or irregular cross-section.

For weaving the woven fabric, a plurality of types of synthetic fiber yarns may be used, as necessary.

The synthetic fiber yarn used for weaving the woven fabric is preferably a multifilament yarn containing 72 filaments or more, from the standpoint of flexibility and smoothness of the coated surface. The upper limit of the number of filaments is not particularly limited. The number of filaments is preferably 216 or less, since the production of the yarn is easy.

The fineness is preferably 0.1 to 10 dpf per single yarn of the synthetic fiber yarn used for weaving the woven fabric.

The total fineness of the yarns constituting the woven fabric is preferably 350 to 1000 dtex. A total fineness of 1000 dtex or less prevents an excessive increase in the thickness of the fabric, making it easy to adjust the thickness in an appropriate range; and thus also prevents an excessive increase in rigidity, making it easy to adjust the rigidity in an appropriate range. Accordingly, the packageability of airbags can be easily improved. A total fineness of 350 dtex or more makes it easy to adjust the mechanical characteristics during airbag operation, such as the tensile strength and tear strength of the coated fabric, to sufficiently high levels.

The cover factor of the woven fabric is preferably 1,800 to 2,500, and more preferably 1,900 to 2,450. A cover factor of 1,800 or more makes it easy to adjust the physical characteristics (tensile strength and tear strength) required for airbags to sufficiently high levels. A cover factor of 2,500 or less makes weaving easy, prevents an excessive increase in rigidity, and improves packageability. The cover factor (CF) can be calculated using the equation below. The unit for total fineness is dtex, and the unit for the weaving density is yarn/2.54 cm.

$$CF = (\text{total fineness of warp})^{1/2} \times \text{warp density} + (\text{total fineness of weft})^{1/2} \times \text{weft density}$$

The woven fabric preferably has an oil amount of 0.2 mass % or less. When the oil amount is 0.2 mass % or less, the adhesiveness with a silicone resin does not overly decrease; and an extreme reduction in the number of cells on the surface of the coating layer due to an excessive decrease in the moisture content in the woven fabric is avoided. In this respect, the oil amount in the woven fabric is more preferably 0.15 mass % or less, and even more preferably 0.10 mass % or less. The lower limit of the oil amount in the woven fabric is not particularly limited; and is generally 0.005 mass % or more, and preferably 0.01 mass % or more.

Coating Layer

The coating layer is disposed on at least one surface of a woven fabric directly, or with one or more other layers interposed between the woven fabric and the coating layer. The coating layer covers at least a part of the surface of the woven fabric. The coating layer preferably covers 90% or more of the surface of the woven fabric, and more preferably covers the entire surface of the woven fabric.

The coating layer preferably comprises a resin. As the resin, a plurality of types of resins may be used, as necessary. The resin is preferably an elastomer resin that has heat resistance, cold resistance, and flame retardancy. The elastomer resin is most preferably a silicone-based resin, in terms of the above.

Specific examples of silicone-based resins include addition polymerization silicone rubber, such as dimethyl silicone rubber, methyl vinyl silicone rubber, methylphenyl silicone rubber, trimethyl silicone rubber, fluorosilicone rubber, methyl silicone resin, methylphenyl silicone resin, methyl vinyl silicone resin, epoxy-modified silicone resin, acrylic-modified silicone resin, polyester-modified silicone resin, and the like. Of these, addition polymerization methyl vinyl silicone rubber is preferable because the rubber exhibits rubber elasticity after being cured, excellent strength and stretchability, and cost advantages.

When a silicone-based resin is used, a curing promoter may be use to impart higher hardness to the coating layer. Examples of curing promoters include platinum-based compounds, such as platinum powder, chloroplatinic acid, and tetrachloroplatinic acid; palladium compounds; rhodium compounds; organic peroxides, such as benzoyl peroxide, p-chlorobenzoyl peroxide, and o-chloro peroxide; and the like.

The coating layer preferably comprises a resin in an amount of 10 g/m$^2$ or more, more preferably 15 g/m$^2$ or more, and even more preferably 20 g/m$^2$ or more, per area of the surface of the woven fabric, in terms of heat resistance. The coating layer of the present invention has higher heat resistance than the coating layer of conventional coated fabrics for airbags, and thus achieves sufficient heat resistance with a lower resin content. The amount of the resin in the coating layer can thus be 200 g/m$^2$ or less per area of the surface of the woven fabric, while achieving sufficient heat resistance. When a smaller amount of the resin is preferred, the amount of the resin can be 100 g/m$^2$ or less. When a still smaller amount of the resin is preferred, the amount of the resin can be 50 g/m$^2$ or less. This allows the coated fabric for airbags of the present invention to be packed compactly, and to have high heat resistance. The coated fabric for airbags of the present invention can also be sufficiently used as a heat-resistant reinforcing fabric. In this case, unlike the conventional technique, it is not necessary to use multiple fabrics by stacking them on top of each other, which facilitates compact packing.

The thickness of the coating layer is preferably 10 μm or more. When the thickness of the coating layer is 10 μm or more, sufficient heat resistance can be easily achieved. For the same reason, the thickness of the coating layer is more preferably 15 μm or more, and even more preferably 20 μm or more. The thickness of the coating layer is preferably 200 μm or less. When the thickness of the coating layer is 200 μm or less, appropriate flexibility can be easily imparted to the coated woven fabric, good packageability can be achieved, and the mass of the fabric can be relatively low when the fabric is used not only as a fabric for the main body, but also as a heat-resistant reinforcing fabric. For the same reason, the thickness of the coating layer is more preferably 100 μm or less, and even more preferably 50 μm or less.

The coating layer comprises a thermally responsive foaming agent, which imparts more excellent heat resistance to the coating layer. The coating layer may comprise one type of thermally responsive foaming agent, or a plurality of types of thermally responsive foaming agents.

The term "thermally responsive foaming agent" as used herein refers to a compound, a composition, or a structure that has the function of generating gas in response to heat. When a thermally responsive foaming agent has already generated gas in response to heat, and the residual material thereof is not considered to retain the function of generating gas, the residual material is not regarded as a "thermally responsive foaming agent."

The thermally responsive foaming agent is not particularly limited, and a wide variety of thermally responsive foaming agents can be used. Examples of thermally responsive foaming agents include thermally decomposable chemical foaming agents, thermally inflatable microcapsules, and the like.

The thermally decomposable chemical foaming agent refers to a compound that generates gas by thermal decomposition.

The thermally decomposable chemical foaming agent preferably has a thermal decomposition temperature of 120 to 240° C., more preferably 130 to 230° C., and even more preferably 140 to 220° C., in terms of heat resistance.

The thermally decomposable chemical foaming agent may be an organic compound or an inorganic compound. Specific examples of organic thermally decomposable chemical foaming agents include azodicarbonamide (ADCA), dinitropentamethylenetetramine (DPT), p,p'-oxybisbenzenesulfonylhydrazide (OBSH), hydrazodicarbonamide (HDCA), tetrazole compounds, and the like. The tetrazole compounds are not particularly limited, and examples include 5-phenyltetrazole (5-phenyl-1H-tetrazole), bistetrazole, such as 5,5-bistetrazole, and salts thereof. Of these, ADCA is particularly preferable. Specific examples of inorganic thermally decomposable chemical foaming agents include sodium hydrogencarbonate ($NaHCO_3$; sodium bicarbonate) and the like.

The thermally inflatable microcapsule is not particularly limited, and can be selected from a wide range. Examples of thermally inflatable microcapsules include those obtained by enclosing a hydrocarbon in a gas barrier plastic capsule. When the ambient temperature rises, the thermally inflatable microcapsule softens, and the hydrocarbon vaporizes to thereby expand the capsule.

From the viewpoint of heat resistance, the coating layer comprises a thermally responsive foaming agent in an amount required to achieve sufficient heat resistance. The amount of the thermally responsive foaming agent contained in the coating layer can be suitably determined, taking into consideration the heat resistance imparted by the thermally responsive foaming agent. The amount of the thermally responsive foaming agent is not particularly limited. The coating layer preferably comprises the thermally responsive foaming agent in a total amount of 0.3 to 40 g/m$^2$, more preferably 0.5 to 15 g/m$^2$, and even more preferably 1 to 10 g/m$^2$, per area of the surface of the woven fabric, in terms of heat resistance.

The coating layer is preferably a porous body having closed cells. The term "porous body having closed cells" as used herein refers to a porous body having a closed cell structure. "Closed cells" means a cell structure in which the cells are isolated from each other. In this respect, the "porous body having closed cells" differs from a porous body having an open cell structure. Since the coating layer is a porous body having closed cells, the gas remaining in the cells decreases the thermal conductivity, resulting in higher heat resistance. In contrast, a porous body having open cells does not show high heat resistance, because the gas is not retained in the porous body. The physical properties of the porous body having closed cells is not particularly limited, and can be selected from a wide range. As physical properties of the porous body having closed cells, the number of cells having a maximum diameter of 20 μm or more is preferably 20 cells/mm$^2$ or more, more preferably 30 cells/mm$^2$ or more, and even more preferably 50 cells/mm² or more, in terms of heat resistance. The upper limit of the number of cells is not particularly limited, and can be suitably determined. The number of cells having a maximum diameter of 150 μm or more is preferably 15 cells/mm² or less, more preferably 10 cells/mm² or less, and even more preferably 5 cells/mm² or less, in terms of the durability of the coating layer. In the present specification, the maximum diameter of a cell refers to the longest chord in a cell cross-section observed in a cross-section of the coating layer.

The method for obtaining the coating layer that is a porous body having closed cells is not particularly limited, and can be selected from a wide range. Examples of the method for obtaining the coating layer that is a porous body having closed cells include a method in which foaming is performed using at least one member selected from the group consisting of chemical foaming agents, inflatable microcapsules, and hollow microcapsules; and the like.

The chemical foaming agent is not particularly limited, and can be selected from a wide range. Examples of chemical foaming agents include the thermally decomposable chemical foaming agents described above, and the like.

The inflatable microcapsule is not particularly limited, and can be selected from a wide range. Examples of inflatable microcapsules include the thermally inflatable microcapsules described above, and the like.

The hollow microcapsule is not particularly limited, and can be selected from a wide range. Examples of hollow microcapsules include silica glass microcapsules and the like.

The coating layer may further comprise an inorganic filler, if necessary. Inorganic fillers are conventionally used for reinforcement, viscosity adjustment, heat resistance improvement, flame retardancy improvement, etc. of coating layer materials, such as silicone rubber. The inorganic filler is not particularly limited, and can be selected from a wide range. Examples include silica particles and the like.

The inorganic filler preferably has a specific surface area of 50 m²/g or more, more preferably 50 to 400 m²/g, and particularly preferably 100 to 300 m²/g. When the specific surface area is within this range, excellent tear strength characteristics can be easily imparted to the obtained coating layer. The specific surface area is measured by a BET method. One type of silica particles may be used singly, or two or more types of silica particles may be used in combination. Examples of silica particles usable in the present invention include natural substances, such as quartz, crystal, silica sand, and diatomite; synthetic substances, such as dry silica, silica fume, wet silica, silica gel, and colloidal silica; and the like.

To more easily impart better flowability to a coating layer material, such as a resin composition, the inorganic filler may be a hydrophobic inorganic filler in which hydrophobization treatment of the surface was performed using an organic silicon compound. Examples of organic silicon compounds include methylchlorosilanes, such as trimethylchlorosilane, dimethyldichlorosilane, and methyltrichlorosilane; dimethylpolysiloxane, hexamethyldisilazane, divinyltetramethyldisilazane, dimethyltetravinyldisilazane, hexaorganodisilazane, and the like.

The inorganic filler content is preferably 10 to 20 mass %, and more preferably 12 to 20 mass %, based on the coating layer material. When the inorganic filler content is 10 mass % or more based on the coating layer material, sufficient mechanical strength can be easily imparted to the coating layer material. When the inorganic filler content is 20 mass % or less based on the coating layer material, sufficient flowability can be easily imparted to the resin composition, the coating workability is good, the resin strength is sufficiently maintained, and sufficient adhesiveness can be easily ensured.

In the present invention, the coating layer material preferably has a viscosity of 10,000 to 50,000 mPa·sec, more preferably 13,000 to 40,000 mPa·sec, and particularly preferably 20,000 to 35,000 mPa·sec. When the viscosity is 10,000 mPa·sec or more, the resin is less likely to penetrate into the woven fabric, making it easy to ensure the resin thickness necessary for achieving heat resistance. When the resin viscosity is 50,000 mPa·sec or less, the coating amount can be easily adjusted as appropriate. The coating layer material may be solvent-based or solvent-free, as long as its viscosity can be adjusted to be within the above range; a solvent-free coating layer material is preferable in consideration of the impact on the environment.

Other Layers

One or more other layers may be disposed between the woven fabric and the coating layer. Examples of other layers include a layer comprising an adhesive aid, which is disposed to improve the adhesiveness between the woven fabric and the coating layer; and the like. A plurality of types of adhesive aids may be used, if necessary. Examples of adhesive aids include amino-based silane coupling agents, epoxy-modified silane coupling agents, vinyl-based silane coupling agents, chloro-based silane coupling agents, mercapto-based silane coupling agents, and the like.

Other Properties of Coated Fabric for Airbags

The coated fabric for airbags of the present invention may be a double-side coated fabric, which is obtained by applying a coating to both sides of the woven fabric. However, in view of packageability, a single-side coated fabric, which is obtained by applying a coating to only one side, is more preferable.

Method for Producing Coated Fabric for Airbags

The method for producing a coated fabric for airbags of the present invention comprises (1) disposing a coating layer material comprising a thermally responsive foaming agent on at least one surface of a woven fabric directly, or with one or more other layers interposed therebetween.

The coating layer material may be, for example, a resin composition or the like. The resin is as described above.

The method for disposing the coating layer material may be a known method. Examples include methods for applying the coating layer material, such as knife coating, comma coating, die coating, gravure roll coating, kiss roll coating, spraying method, dip method, and the like.

The amount of the thermally responsive foaming agent contained in the coating layer material can be suitably determined, taking into consideration the heat resistance imparted by the thermally responsive foaming agent. The amount of the thermally responsive foaming agent is not particularly limited. In view of heat resistance, the coating layer material preferably comprises the thermally responsive foaming agent in a total amount of 0.5 to 100 mass %, more preferably 1 to 50 mass %, and even more preferably 2 to 30 mass %, based on the coating layer material.

When the coating layer material, such as a resin composition, is continuously applied by knife coating to a long woven fabric, the fabric tension in the traveling direction of the fabric is preferably controlled to be in the range of 300 to 1,800 N/m, and preferably 500 to 1,600 N/m. When the fabric tension is 300 N/m or more, the selvages of the woven fabric are less likely to be bulky, a large difference in the coating amount between the central portion and the edge portions of the fabric is less likely to be caused, and a large variation in the thickness in the width direction can be easily avoided. When the fabric tension is 1,800 N/m or less, the crimp ratio balance between the warp and weft is less likely to be lost, the coating amount can be easily maintained in a specific range in both the warp and weft directions, and a decrease in heat resistance can be easily avoided.

As the method for drying and curing the coating agent after application, general heating methods, such as hot air, infrared light, and microwave, can be used. A hot-air application method is widely used in terms of cost. The heating temperature and time are not limited, as long as a temperature high enough to cure the silicone resin applied is obtained. The heating temperature is preferably 150 to 220° C., and the heating time is preferably 0.2 to 5 minutes.

In a preferred embodiment, the coating layer is a porous body having closed cells, and the step of obtaining such a coating layer includes a step of inflating at least one member selected from the group consisting of chemical foaming agents, inflatable microcapsules, and hollow microcapsules. These chemical foaming agents, inflatable microcapsules, and hollow microcapsules may be those mentioned above. This step may be performed simultaneously with step (1), or after step (1).

Coating Composition

The coating composition of the present invention is used for coating of a coated fabric for airbags, and comprises a thermally responsive foaming agent.

The coating composition of the present invention is preferably used for a method for producing a coated fabric for airbags at a temperature lower than the foaming start temperature of the thermally responsive foaming agent. A coating layer comprising a thermally responsive foaming agent can thus be obtained. When a thermally decomposable chemical foaming agent is used as the thermally responsive foaming agent, the composition is preferably used for a method for producing a coated fabric for airbags at a temperature lower than the thermal decomposition temperature of the foaming agent.

The coating composition of the present invention is used for producing the coating layer, and has the same constitution as that of the coating layer material described above.

EXAMPLES

The present invention is described below in detail with reference to Examples. However, the present invention is not limited to these Examples.

Areal Weight

The areal weight was measured in accordance with JIS L1096 (2010) 8.4.1. Two test pieces (about 200 mm×200 mm) were taken from a sample; the absolute dry mass (g) of each test piece was weighed; and the mass per 1 m$^2$ (g/m$^2$) was determined. The average value thereof was considered to be the areal weight.

Method for Measuring Coating Amount

A sample was cut into a 5 cm×6 cm square, and precisely weighed. The sample was washed with cyclohexane at room temperature for 5 minutes twice, and dried at 105° C. for 12 hours. Formic acid was added, and the sample was allowed to stand at room temperature for 12 hours. The procedure of replacing formic acid and allowing the sample to stand at room temperature for 6 hours was repeated three times; and the sample was washed with distilled water three times, and air-dried. The sample was then washed with cyclohexane at room temperature for 5 minutes three times, and air-dried. After the sample was dried at 105° C. for 6 hours, the sample was allowed to cool, and the silicone coating amount was calculated.

Evaluation of Heat Resistance

A sample was cut into a size of 30 cm (warp)×5 cm (weft), and the sample was fixed under a load of 50 N in the warp direction. An outlet (inner diameter: 6 mm) connected to a hot-air blower (produced by Ishizaki Electric Mfg. Co., Ltd.; PlaJet PJ-214A) was placed 1.5 cm away from the sample such that the hot-air blowing direction was perpendicular to the sample. The air-blowing level of the hot-air blower was set to maximum (H), and the hot-air temperature was set to "low." After the blowing rate and the blowing temperature were constant, hot air was applied to the fabric, and the time required until the sample melted to form a hole was measured to evaluate the heat resistance of the sample.

Example 1

A plain-weave fabric was woven from nylon 6.6 multifilament fiber containing 72 filaments that had a total fineness of 470 dtex, using a water-jet loom. Subsequently, the fabric was subjected to shrinkage processing with boiling water, and dry-finishing at 110° C. The obtained woven fabric had a weaving density in the warp and weft directions of 46 yarns/2.54 cm, and an areal weight of 180 g/m$^2$.

Thereafter, a mixture obtained by mixing, with an addition polymerization methyl vinyl silicone resin, an ADCA foaming agent (produced by Eiwa Chemical Ind. Co., Ltd.; VINYFOR AC#R), which is a thermally decomposable chemical foaming agent, in an amount of 3 mass % with respect to the resin was applied once to one surface of the woven fabric by knife coating; and curing treatment was performed at 190° C. for 1 minute, thereby obtaining a silicone-coated fabric having a coating amount (including the ADCA foaming agent) of 30 g/m$^2$ and an areal weight of 210 g/m$^2$.

Example 2

A plain-weave fabric was woven from nylon 6.6 multifilament fiber containing 72 filaments that had a total fineness of 470 dtex, using a water-jet loom. Subsequently, the fabric was subjected to shrinkage processing with boiling water, and dry-finishing at 110° C. The obtained woven fabric had a weaving density in the warp and weft directions of 46 yarns/2.54 cm, and an areal weight of 180 g/m$^2$.

Thereafter, a mixture obtained by mixing, with an addition polymerization methyl vinyl silicone resin, an ADCA foaming agent (produced by Eiwa Chemical Ind. Co., Ltd.; VINYFOR AC#R) in an amount of 7 mass % with respect to the resin was applied once to one surface of the woven fabric by knife coating; and curing treatment was performed at 190° C. for 1 minute, thereby obtaining a silicone-coated fabric having a coating amount (including the ADCA foaming agent) of 30 g/m$^2$ and an areal weight of 210 g/m$^2$.

Example 3

A plain-weave fabric was woven from nylon 6.6 multifilament fiber containing 72 filaments that had a total fineness of 470 dtex, using a water-jet loom. Subsequently, the fabric was subjected to shrinkage processing with boiling water, and dry-finishing at 110° C. The obtained woven fabric had a weaving density in the warp and weft directions of 46 yarns/2.54 cm, and an areal weight of 180 g/m².

Thereafter, a mixture obtained by mixing, with an addition polymerization methyl vinyl silicone resin, an ADCA foaming agent (produced by Eiwa Chemical Ind. Co., Ltd.; VINYFOR AC#R) in an amount of 15 mass % with respect to the resin was applied once to one surface of the woven fabric by knife coating; and curing treatment was performed at 190° C. for 1 minute, thereby obtaining a silicone-coated fabric having a coating amount (including the ADCA foaming agent) of 30 g/m² and an areal weight of 210 g/m².

Example 4

A plain-weave fabric was woven from nylon 6.6 multifilament fiber containing 72 filaments that had a total fineness of 470 dtex, using a water-jet loom. Subsequently, the fabric was subjected to shrinkage processing with boiling water, and dry-finishing at 110° C. The obtained woven fabric had a weaving density in the warp and weft directions of 46 yarns/2.54 cm, and an areal weight of 180 g/m².

Thereafter, a mixture obtained by mixing, with an addition polymerization methyl vinyl silicone resin, an ADCA foaming agent (produced by Eiwa Chemical Ind. Co., Ltd.; VINYFOR AC#R) in an amount of 7 mass % with respect to the resin and hollow glass microspheres (produced by Potters; Q-CEL 6019) in an amount of 7 mass % with respect to the resin was applied once to one surface of the woven fabric by knife coating; and curing treatment was performed at 190° C. for 1 minute, thereby obtaining a silicone-coated fabric having a coating amount (including the ADCA foaming agent and the hollow glass microspheres) of 30 g/m² and an areal weight of 210 g/m². Since the silicone coating contained the hollow glass microspheres, the coating was a porous body having closed cells.

Example 5

A plain-weave fabric was woven from nylon 6.6 multifilament fiber containing 72 filaments that had a total fineness of 470 dtex, using a water-jet loom. Subsequently, the fabric was subjected to shrinkage processing with boiling water, and dry-finishing at 110° C. The obtained woven fabric had a weaving density in the warp and weft directions of 46 yarns/2.54 cm, and an areal weight of 180 g/m².

Thereafter, a mixture obtained by mixing, with an addition polymerization methyl vinyl silicone resin, an ADCA foaming agent (produced by Eiwa Chemical Ind. Co., Ltd.; VINYFOR AC#R) in an amount of 7 mass % with respect to the resin and a thermally inflatable microcapsule foaming agent (produced by Kureha Corporation; H750) in an amount of 7 mass % with respect to the resin was applied once to one surface of the woven fabric by knife coating; and curing treatment was performed at 190° C. for 1 minute, thereby obtaining a fabric with silicone coating that had a coating amount (including the ADCA foaming agent) of 30 g/m² and an areal weight of 210 g/m². The silicone coating was a porous body having closed cells due to foaming of the thermally inflatable microcapsule foaming agent.

Comparative Example 1

A plain-weave fabric was woven from nylon 6.6 multifilament fiber containing 72 filaments that had a total fineness of 470 dtex, using a water-jet loom. Subsequently, the fabric was subjected to shrinkage processing with boiling water, and dry-finishing at 110° C. The obtained woven fabric had a weaving density in the warp and weft directions of 46 yarns/2.54 cm, and an areal weight of 180 g/m².

Thereafter, an addition polymerization methyl vinyl silicone resin was applied once to one surface of the woven fabric by knife coating; and curing treatment was performed at 190° C. for 1 minute, thereby obtaining a silicone-coated fabric having a coating amount of 30 g/m² and an areal weight of 210 g/m².

Comparative Example 2

A plain-weave fabric was woven from nylon 6.6 multifilament fiber containing 72 filaments that had a total fineness of 470 dtex, using a water-jet loom. Subsequently, the fabric was subjected to shrinkage processing with boiling water, and dry-finishing at 110° C. The obtained woven fabric had a weaving density in the warp and weft directions of 46 yarns/2.54 cm, and an areal weight of 180 g/m².

Thereafter, a mixture obtained by mixing, with an addition polymerization methyl vinyl silicone resin, hollow glass microspheres (produced by Potters; Q-CEL 6019) in an amount of 7 mass % with respect to the resin was applied once to one surface of the woven fabric by knife coating; and curing treatment was performed at 190° C. for 1 minute, thereby obtaining a silicone-coated fabric having a coating amount (including the hollow glass microspheres) of 30 g/m² and an areal weight of 210 g/m². Since the silicone coating contained the hollow glass microspheres, the coating was a porous body having closed cells.

Comparative Example 3

A plain-weave fabric was woven from nylon 6.6 multifilament fiber containing 72 filaments that had a total fineness of 470 dtex, using a water-jet loom. Subsequently, the fabric was subjected to shrinkage processing with boiling water, and dry-finishing at 110° C. The obtained woven fabric had a weaving density in the warp and weft directions of 46 yarns/2.54 cm, and an areal weight of 180 g/m².

Thereafter, a mixture obtained by mixing, with an addition polymerization methyl vinyl silicone resin, a thermally inflatable microcapsule foaming agent (produced by Kureha Corporation; H750) in an amount of 7 mass % with respect to the resin was applied once to one surface of the woven fabric by knife coating; and curing treatment was performed at 190° C. for 1 minute, thereby obtaining a fabric with silicone coating that had a coating amount of 30 g/m² and an areal weight of 210 g/m². The silicone coating was a porous body having closed cells due to foaming of the thermally inflatable microcapsule foaming agent. Comparative Example 4

A plain-weave fabric was woven from nylon 6.6 multifilament fiber containing 72 filaments that had a total fineness of 470 dtex, using a water-jet loom. Subsequently, the fabric was subjected to shrinkage processing with boiling water, and dry-finishing at 110° C. The obtained woven fabric had a weaving density in the warp and weft directions of 46 yarns/2.54 cm, and an areal weight of 180 g/m².

Thereafter, a mixture obtained by mixing, with an addition polymerization methyl vinyl silicone resin, an ADCA foaming agent (produced by Eiwa Chemical Ind. Co., Ltd.; VINYFOR AC#R) in an amount of 7 mass % with respect to the resin was applied once to one surface of the woven fabric by knife coating; and curing treatment was performed at 220° C. for 1 minute, thereby obtaining a fabric with silicone coating that had a coating amount of 30 g/m² and an areal weight of 210 g/m². The silicone coating was a porous body having an open cell structure due to foaming of the ADCA foaming agent.

Comparative Example 5

A plain-weave fabric was woven from nylon 6.6 multifilament fiber containing 72 filaments that had a total fineness of 470 dtex, using a water-jet loom. Subsequently, the fabric was subjected to shrinkage processing with boiling water, and dry-finishing at 110° C. The obtained woven fabric had a weaving density in the warp and weft directions of 46 yarns/2.54 cm, and an areal weight of 180 g/m².

Thereafter, a mixture obtained by mixing, with an addition polymerization methyl vinyl silicone resin, an ADCA foaming agent (produced by Eiwa Chemical Ind. Co., Ltd.; VINYFOR AC#R) in an amount of 3.5 mass % with respect to the resin and sodium hydrogencarbonate (produced by Eiwa Chemical Ind. Co., Ltd.; Cellborn FE-507) in an amount of 3.5 mass % was applied once to one surface of the woven fabric by knife coating; and curing treatment was performed at 160° C. for 1 minute, thereby obtaining a fabric with silicone coating that had a coating amount of 30 g/m² and an areal weight of 210 g/m². The silicone coating was a porous body having an open cell structure due to foaming of the sodium hydrogencarbonate foaming agent.

TABLE 1

| | Foaming agent contained in silicone coating | | (a) Chemical foaming agent foamed in the process of production of silicone coating, or (b) inflatable microcapsules or hollow microcapsules contained in silicone coating | | | Heat resistance |
|---|---|---|---|---|---|---|
| | Name | Amount used (mass %) | Name | Amount used (mass %) | Properties of silicone coating | evaluation-melt time (msec) |
| Example 1 | ADCA | 3 | — | — | Non-porous body | 1550 |
| Example 2 | ADCA | 7 | — | — | Non-porous body | 1620 |
| Example 3 | ADCA | 15 | — | — | Non-porous body | 1710 |
| Example 4 | ADCA | 7 | Glass microspheres | 7 | Porous body having closed cells | 3000 |
| Example 5 | ADCA | 7 | Thermally inflatable microcapsules | 7 | Porous body having closed cells | 3040 |
| Comparative Example 1 | — | — | — | — | Non-porous body | 1400 |
| Comparative Example 2 | — | — | Glass microspheres | 7 | Porous body having closed cells | 1450 |
| Comparative Example 3 | — | — | Thermally inflatable microcapsules | 7 | Porous body having closed cells | 1450 |
| Comparative Example 4 | — | — | ADCA | 7 | Porous body having an open cell structure | 1300 |
| Comparative Example 5 | ADCA | 3.5 | Sodium hydrogencarbonate | 3.5 | Porous body having an open cell structure | 1450 |

The invention claimed is:

1. A coated fabric for airbags, comprising a coating layer disposed on at least one surface of a woven fabric directly or with one or more other layers interposed therebetween,
wherein the coating layer comprises a thermally responsive foaming agent and is a porous body having closed cells.

2. The coated fabric for airbags according to claim 1, wherein the thermally responsive foaming agent is a thermally decomposable chemical foaming agent.

3. The coated fabric for airbags according to claim 2, wherein the thermally decomposable chemical foaming agent comprises azodicarbonamide (ADCA), dinitropentamethylenetetramine (DPT), p,p'-oxybisbenzenesulfonylhydrazide (OBSH), hydrazodicarbonamide (HDCA), a tetrazole compound, or sodium hydrogencarbonate.

4. The coated fabric for airbags according to claim 3, wherein the tetrazole compound is 5-phenyl-1H-tetrazole, 5,5-bistetrazole, or a salt thereof.

5. The coated fabric for airbags according to claim 1, wherein the coating layer is a layer foamed using at least one member selected from the group consisting of chemical foaming agents, inflatable microcapsules, and hollow microcapsules.

6. The coated fabric for airbags according to claim 1, wherein the coating layer comprises a resin.

7. The coated fabric for airbags according to claim 6, wherein the resin is a silicone-based resin.

8. The coated fabric for airbags according to claim 1, wherein the coating layer comprises a resin in an amount of 10 to 200 g/m$^2$ per area of the surface of the woven fabric.

9. The coated fabric for airbags according to claim 1, wherein the coating layer comprises the thermally responsive foaming agent in a total amount of 0.3 to 40 g/m$^2$ per area of the surface of the woven fabric.

10. The coated fabric for airbags according to claim 1, wherein the coating layer is formed by a composition containing a resin, the thermally responsive foaming agent, and a member selected from the group consisting of chemical foaming agents, inflatable microcapsules, and hollow microcapsules.

11. The coated fabric for airbags according to claim 1, wherein the member comprises hollow glass microspheres or a thermally inflatable microcapsule foaming agent.

12. A method for producing a coated fabric for airbags, the method comprising:
   disposing a coating layer material comprising a thermally responsive foaming agent on at least one surface of a woven fabric directly or with one or more other layers interposed therebetween;
   wherein the coating layer is a porous body having closed cells.

\* \* \* \* \*